United States Patent [11] 3,598,105

| [72] | Inventor | Liborio B. Cristaldi<br>148 Ashland Ave., Bloomfield, N.J. 07003 |
|---|---|---|
| [21] | Appl. No. | 14,054 |
| [22] | Filed | Feb. 25, 1970 |
| [45] | Patented | Aug. 10, 1971<br>Continuation-in-part of application Ser. No. 731,557, May 23, 1968, now abandoned. |

[54] COVER FOR COOKING, HEATING OR FRYING VESSELS WITH FLUID TRANSPORT AND VENTING MEANS
14 Claims, 20 Drawing Figs.

| [52] | U.S. Cl. | 126/381, 126/384, 220/44 A |
|---|---|---|
| [51] | Int. Cl. | A47j 36/06 |
| [50] | Field of Search | 126/381, 383, 384, 385, 386; 220/44 A |

[56] References Cited
UNITED STATES PATENTS

| 1,039,140 | 9/1912 | Kampfe | 126/384 |
|---|---|---|---|
| 1,188,697 | 6/1916 | Steinberg | 126/384 |
| 1,676,146 | 7/1928 | Krafft | 126/381 |

FOREIGN PATENTS

| 20,030 | 9/1909 | Great Britain | 126/384 |
|---|---|---|---|

*Primary Examiner*—Frederick L. Matteson
*Assistant Examiner*—Robert A. Dua
*Attorney*—Popper, Bain and Bobis ABSTRACT: A cover or lid for a vessel designed for cooking or heating liquids and mixtures of liquids and solids which has means adapted both to vent vapor and noncondensible gases from the cooking or heating vessel and to permit additional liquid to be passed into the cooking or heating vessel without the necessity of removing the cover from the vessel. The cover or lid also is constructed to coact with the venting and transport means to condense vapors and return the liquid condensed to the liquid or mixture being cooked, heated or fried in the vessel. The cover or lid may consist of an annular rim section and a middle section. The middle section can be transparent and can be integral with, separable from or detachably connected to the annular rim section of the cover or lid.

Additionally, the cover or lid with the transparent middle section may coact with a wiping means for cleaning the inner face of this section.

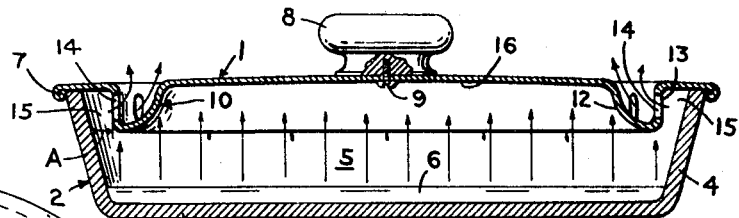
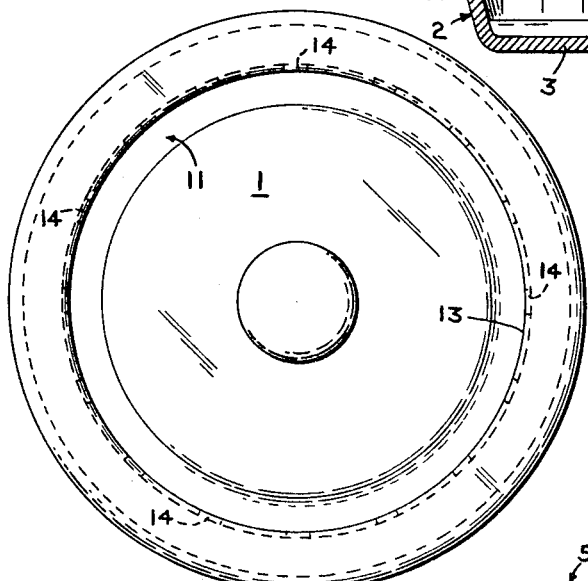
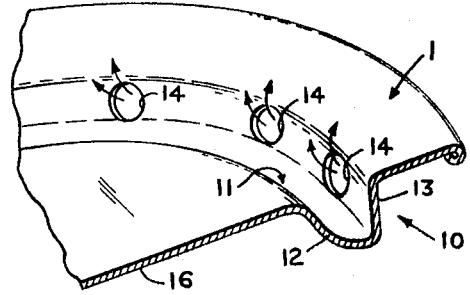
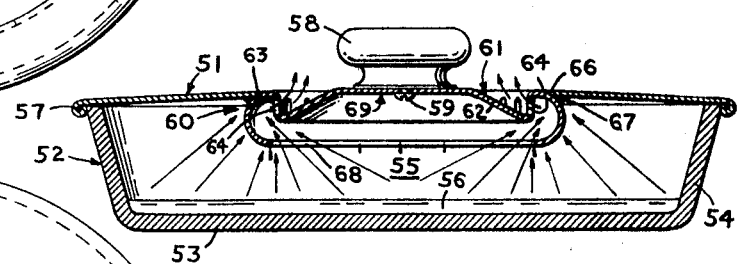
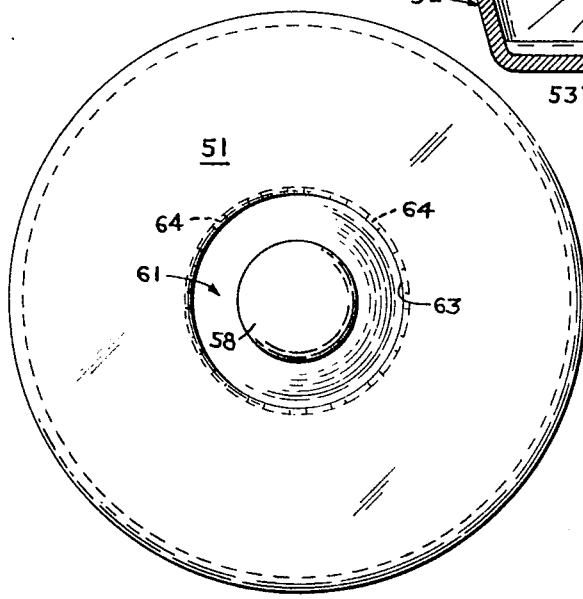
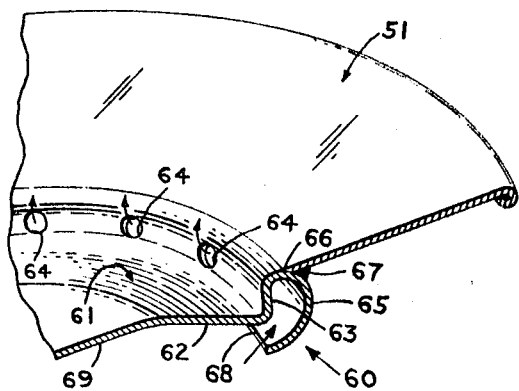
LIBORIO B. CRISTALDI
INVENTOR.
BY Popper Bain + Bobis
Attys

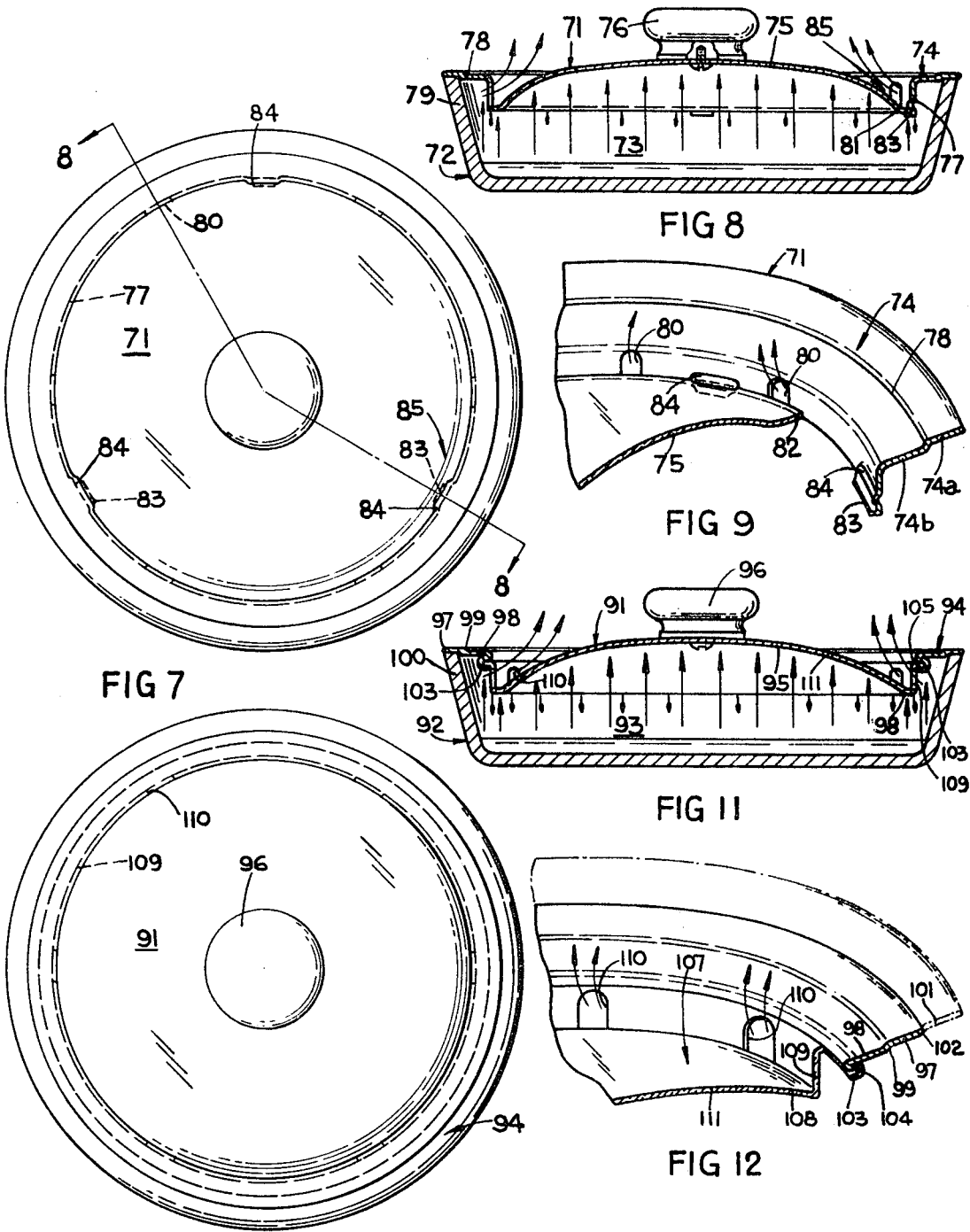

PATENTED AUG 10 1971

LIBORIO B. CRISTALDI
*INVENTOR.*

BY Popper Bain & Bobis
attys

COVER FOR COOKING, HEATING OR FRYING VESSELS WITH FLUID TRANSPORT AND VENTING MEANS

This application is a continuation-in-part and is related to and includes all of the original disclosure and allowed claims from the copending application Ser. No. 731,557 filed May 23, 1968 and to be abandoned.

BACKGROUND OF INVENTION

It is a recognized problem particularly in the cooking arts that when liquids such as water and oil are mixed where either liquid is hot or is simmering that excessive spattering will occur.

This is not only dangerous but further produces an unsightly and untidy appearance in the area surrounding the vessel in which such mixing is being performed.

In order to solve this problem it is highly desirable to provide such cooking, heating or frying vessel with a lid which will permit liquid to be charged or passed through the lid into the chamber formed between the lid and the vessel without the necessity of removing the lid therefrom.

In the arts for heating liquids and more particularly in the cooking arts, there are various cover devices. Some embody means to permit liquid to be added to the chamber formed by the vessel and its cover. Some permit the venting of vapors and gases without requiring the cover to be removed from the vessel.

Additionally, if the lid can remain in position on the vessel, as a shield it serves to keep the area in the vicinity in which the cooking or frying vessel is located clean and free of the material or liquid being heated; as for example, the surface of a cooking oven or stove on which such liquid mixture is being heated.

Further, however, it is highly desirable to allow for venting at least a portion of the vapors and the noncondensible gases from the chamber formed by the cooking or frying vessel and its cover or lid and also to produce a refluxing action; that is produce condensation of some of the release vapors, generally water vapors; and to do construct the cover so that these condensed water vapors will be returned to the mixture being cooked or heated in the vessel.

The prior art devices such as those shown in U.S. Pat. Nos. 2,867,352; 2,348,507; 1,794,940 and 534,138 suggest devices which permit the venting of vapors and noncondensible gases and for the above-mentioned refluxing action.

Of these above mentioned patents, only U.S. Pat. 2,348,507 suggests the possibility that the venting openings in the cover may be used to pass fluid therethrough to the contents of the liquid being heated in the chamber formed by the vessel and the cover there shown.

It is clear that no precautions are taken to meet the problem where excessive spattering will occur.

SUMMARY OF INVENTION

In the present application, an improved cover or lid is provided which permits the easy delivery of fluid into the chamber formed by the vessel and the cover or lid, continuous communication for the venting of vapors and noncondensible gases; and the undersurface of the cover or lid is constructed to permit continuous refluxing action most desirable in those cooking arts where a mixture of water and hot oil are used in the cooking process.

Thus, the present invention provides a cover or lid for a cooking or heating vessel more particularly for liquids or mixtures of liquids and solids comprising a generally platelike member constructed to form a reservoir with at least one wall of the reservoir normal to the plane of the platelike member in which a plurality of venting and fluid transport openings are provided, the openings being either positioned for automatic shielding to prevent escape of spattering liquid from the vessel or operatively associated with a specific shielding means connected to the platelike member; the underside of the reservoir and plate also being so constructed as to cause condensation of vapors and the return to the liquid or mixture in the cooking or heating vessel of the condensed vapors.

Additionally, it is desirable to be able to observe the ingredients in the chamber formed in the vessel when the cover or lid is in assembled or operating position.

Accordingly, the present invention further covers a cover or lid for a cooking or heating vessel as above described having a transparent section formed thereon.

Thus the present invention also covers a cooking or heating vessel more particularly for liquids or mixtures of liquids and solids comprising a generally platelike member including an annular rim section and a transparent medial section operatively associated with the rim portion, the platelike member being formed or provided with a reservoir normal to the plane of the platelike member and having a plurality of venting and fluid transport openings therein as above-described.

The present invention also covers a cover or lid including a transparent section as above described with means for cleaning the transparent section to permit observation of the liquid or other mixture in the cooking or heating vessel.

The present invention also covers a cover or lid including a transparent section as above described in which the transparent section is detachably connected to the annular rim section or is separable therefrom.

OBJECTS AND ADVANTAGES OF THE INVENTION

Accordingly, it is an object of the present invention to provide a simple improved cover or lid means for a cooking or heating vessel which provides a transport means therethrough for safely adding fluid to the material being cooked or heated in the vessel.

It is another object of the present invention to provide a simple improved cover or lid means for a cooking or heating vessel which prevents spattering or splashing of the liquid or other material being heated in the cooking vessel either during the heating and cooking period or during the time that liquid is being added to the vessel through the transport openings provided in the cover or lid means.

It is another object of the present invention to provide a simple improved cover or lid adapted to condense vapors and return the same to the liquid or mixture being cooked or heated in an associated cooking, heating or frying vessel.

It is another object of the present invention to provide a cover or lid for a cooking or heating vessel, which the cover or lid has a transparent portion to permit viewing the material in the cooking or heating vessel.

It is a further object of the present invention to provide a cover or lid for a cooking or heating vessel which cover or lid has a transparent portion and means to maintain the transparent portion clean when the cover or lid is in operation.

It is a still further object of the present invention to provide a cover or lid for a cooking or heating vessel which cover or lid has a transparent portion adapted to be detachably connected to or separable from the remaining portion of the cover or lid.

Other objects, advantages and related applications and forms of this device will become apparent to those skilled in this art from the description of the embodiments of the present inventions and methods of making the same as illustrated in the accompanying drawings wherein:

FIG. 1 is a top view of one form of cover or lid means in accordance with the present invention.

FIG. 2 shows a vertical section through the form of the invention shown in FIG. 1 in assembled position on a cooking or heating vessel.

FIG. 3 is a partial perspective view of a segment of the cover or lid means as shown in FIG. 1.

FIG. 4 is a top view of another form of cover or lid means in accordance with the present invention.

FIG. 5 shows the cover or lid means shown in FIG. 4 in assembled position on a cooking or heating vessel.

FIG. 6 is a partial perspective view of a segment of the cover or lid means as shown in FIG. 4 of the drawings.

FIG. 7 is a top view of another form of cover or lid means in accordance with the present invention having a transparent central section detachably connected to the rim section of the cover or lid means.

FIG. 8 shows a vertical section taken on line 8-8 of FIG. 7.

FIG. 9 is a partial perspective view partly broken away of a segment of the cover or lid means shown in FIG. 7.

FIG. 10 is a top view of another form of cover or lid means in accordance with the present invention having a transparent section and a rim section.

FIG. 11 is a vertical section taken on line 11-11 of FIG. 10.

FIG. 12 is a partial perspective of a segment of the cover or lid means shown in FIG. 10 with an extra peripheral section shown in phatomized lines.

Figure 14:
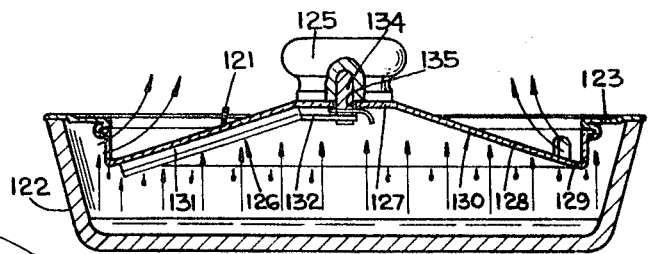
FIG. 14 is a vertical section taken on line 14-14 of FIG. 13.

Referring to the drawings, FIGS. 1, 2 and 3 show one form of improved cover or lid means generally designated 1 in accordance with the present invention.

The cover or lid means 1 coacts with a heating, cooking or frying vessel generally designated 2, which vessel is cuplike in form having a bottom 3 and a sidewall 4 extending upwardly from the bottom thereof, so that in assembled position, the cover or lid means 1 will form with the vessel 2 a heating, cooking or frying space or chamber generally designated 5.

The chamber is illustrated as having some liquid 6 therein, however, it is clear that the vessel can receive not only liquids or mixtures of liquids but also combination of solids or solids and liquids which may require cooking, heating or frying.

In FIGS. 1, 2 and 3, the cover or lid means 1 is illustrated as a substantially circular platelike member in the more or less conventional form of covers or lids for cooking vessels as is well known to the public.

It will be understood, however, that the lid could be square, octagon, or have other shapes than those illustrated in the drawings without departing from the scope of the present invention.

Further, the cover or lid means can be made of a variety of materials such as stainless steel or other corrosion resistent material or it may be made of a metal coated with a suitable plastic such as polytetrafluoroethylene or any similar materials to provide the desired corrosion resistent device of the present invention, alternatively it could be formed from a ceramic or like material which can be subjected to high temperature as will be understood by those skilled in this art.

The cover or lid means 1 is illustrated as having a bead means 7 formed around the peripheral edge thereof to facilitate holding the cover or lid means in assembled position on the vessel 2.

The cover or lid means 1 will also be provided with a suitable handle 8 which may be attached to the cover means as by threaded member 9 shown in FIG. 2 of the drawings:

VENTING AND FLUID TRANSPORT MEANS FIG. 1 FORM OF THE INVENTION

In order to permit liquids to be passed into the chamber 5 formed by the cover or lid means 1 and the heating, cooking or frying vessel 2 and also to permit vapors and noncondensible gases to be vented from the chamber means 5, a venting and fluid transport means generally designated 10 is provided in the cover or lid means 1.

In FIGS. 1, 2 and 3 of the drawing, the venting and fluid transport means 10 consists of an annular reservoir or groove 11 which is struck or formed in the cover or lid means 1 substantially concentric to and inwardly of the bead means 7 about the peripheral edge of the cover or lid means 1.

When the annular reservoir or groove 11 is formed, it will have at least one curved wall 12 and at least one wall 13 substantially and generally normal or perpendicular to the horizontal plane of the cover or lid means 1.

As is shown clearly in FIGS. 2 and 3 of the drawings, the wall 13 has a plurality of spaced transport openings 14 formed therethrough which openings communicate at one end with the annular reservoir of the venting and fluid transport means and at the other end with the chamber 5 formed between the cover or lid means 1 and the vessel 2.

Thus, when the cover or lid means 1 is in assembled position on the vessel 2 the annular reservoir extends into the chamber 5 formed therebetween so that the wall 13 normal to the horizontal plane of the cover or lid means 1 will be disposed a predetermined distance A from the inner face of the sidewall 4 of the heating, cooking or drying vessel 2.

The spacing of the wall 13 from the inner face of the sidewall 4 of the heating, cooking and frying vessel 2 is important to the present invention because this positioning acts to form a sort of cul-de-sac as at 15 between the wall 13 and the inner surface of the sidewall 4 which serves to prevent material which splashes and splatters in the chamber 5 from escaping when the vessel is being used as in heating, cooking, frying operation.

The predetermined desired distance between the wall 13 and the inner surface of the sidewall 4 of the vessel 2 will depend upon many factors such as the liquid being heated, cooked or fried, the viscosity thereof, the type of material, the angle of the sidewall, the depth of the vessel and also the size of the transport openings 14 in the wall 13.

Generally, however, it has been found that where the wall 13 is formed so as to provide a space between the wall 13 and the sidewall 4 of the vessel in a range from one-fourth inch to one inch, that satisfactory results have been obtained.

Further, it will be noted that the curved portion 12 of the annular reservoir 11 is continuous with the somewhat rounded inner wall portion 16 of the cover or lid 1 for purposes which will appear clear in the description of the operative relation between the cover or lid 1 and the vessel 2.

OPERATION

In operation, the vessel is placed on the unit required for heating, cooking or frying such as a stove or other burner means and the liquids or materials to be heated, cooked or fried are initially placed in the vessel before the cover or lid means has been placed thereon.

Initial heating, can then be performed either with the cover or lid means on or off depending on the nature and use to which the vessel 2 is being put.

With the lid means on, if it is desired to add further fluid or liquid to the liquid or the mixture of liquid and solid being cooked, heated or fried in the chamber 5, then without removing the cover or lid means 1 from the vessel, it is possible to pour such fluid or liquid into the annular reservoir 11 of the fluid and transport means 10 in the cover or lid means 1. This fluid will pass through the transport openings 14 and drop either against the inner face of the sidewall 4 of the cooking vessel or directly into the liquid or mixture being cooked, heated or fried therein, depending, of course, on the height of the vessel and the relative proximity of the wall 14 to the inner face of the sidewall 4 of the vessel.

It is believed clear that if it is desired to insure absolute safety of the operation that the wall 13 will be established so the clearance between the wall 13 and the inner face of the sidewall 4 of the cooking or heating vessel will be relatively narrow, although it is believed clear from the drawings that even with wide clearances, it is most difficult to permit splashing or spattering from escaping through the transport openings 14.

The transport openings 14 as indicated above, can also be made smaller as a further safety measure in this form of the invention. The number and shape can also be changed.

Since the rounded or domed inner surface 16 of the cover or lid 1 is continuous with the curved portion 12 of the annular reservoir 11 vapors which condense on the cooler cover or lid 1 will travel in a direction towards the lowermost point of the curved portion 12 and return to the liquid or mixture being cooked, heated or fried in the vessel. This movement of the condensed vapors frees the surface for further condensing action so that substantial refluxing occurs with a resultant lower loss of vapors then would normally occur.

ANOTHER FORM OF COVER OR LID MEANS

In FIGS. 4, 5 and 6 another form of cover or lid means generally designated 51 is illustrated and this form of the inventions differs from that of the form shown in FIG. 1 in that it provides a positive shielding means to the transport openings so as to insure against the escape therethrough of spattering or splashing of the liquid or substance being cooked, heated or fried in the coacting, heating, cooking or frying vessel 52 as illustrated clearly in FIG. 5 of the drawings.

As in the form of the invention above described, the cooking, heating or frying vessel 52 is cuplike in form having a bottom 53 and a sidewall 54 extending upwardly from the bottom thereof so that in assembled position, the cover or lid means 51 will form with the vessel 52, a cooking, heating or frying space or chamber generally designated 55. The chamber 55 is illustrated as having some liquid 56 therein. However, it is clear that the vessel can receive not only liquids or mixtures of liquids but also combinations of solids or solids and liquids which may require, cooking, heating or frying.

In FIGS. 4, 5 and 6, the cover or lid means 51 is again illustrated as a substantially circular platelike member having the more or less conventional form of covers or lids for cooking vessels as is well known to the public and of course, the cover or lid means can be made of corrosion resistent material as mentioned with respect to the form of the invention described in FIGS. 1, 2 and 3.

The cover or lid means 51 will have a bead means 57 formed about the peripheral edge and a suitable handle 58 which is attached to the cover or lid means 51 by the threaded member 59 as is clearly shown in FIGS. 4 and 5 of the drawings.

In order to permit liquids to be passed into the chamber 55, formed by the cover or lid means 51 and the cooking, heating or frying vessel 52, and also to permit vapors and noncondensible gases to be vented from the chamber means 55, a fluid transport and venting means generally designated 60 is provided in the cover or lid means 51. In the form of the invention shown in FIGS. 4, 5 and 6, the venting and fluid transport 60 consists of an annular reservoir or groove 61 which is struck or formed in the cover or lid means 51 substantially concentric to and a spaced distance from the bead means 57. The spacing being such in the illustrated form of the present invention as to place the annular reservoir or groove 61 approximately midway between the center of the cover or lid means 51 and the bead means 57, it being understood that this can be varied depending upon the respective method of construction for a particular cover or lid means 51.

The annular reservoir or groove 61 will again in this form of the invention be formed with at least one curved wall 62 and at least one wall 63 generally normal or perpendicular to the horizontal plane of the cover or lid means 51 and the said wall 63 will have a plurality of spaced transport openings as at 64 formed therethrough which transport openings 64 communicate at one end with the annular reservoir of the fluid transport and venting means for this form of the invention and at the other end with the chamber 55 formed between the cover or lid means 51 and the vessel 52.

Thus, when the cover or lid means 51 is in assembled position, on the vessel 52, the annular reservoir 61 is below the inner surface of the cover or lid means 51 and extends into the chamber 55. This is noted because the rounded or curved wall 62 of the annular reservoir is continuous with the somewhat curved or domed inner-surface of the cover or lid means 51 and this will provide a path for the condensed vapors formed on the inner surface of the cover or lid means 51 so as to return such condensed vapors readily to the liquid in the chamber 55 being cooked, heated or fried.

Since in this form of the invention, the annular reservoir or groove is a spaced distance from the sidewall 54 of the vessel 52 and therefore, cannot obtain the beneficial shielding that the sidewall provides, it is necessary to meet the problem that spattering or splashing of liquid might produce through the transport openings 54 and this is accomplished by providing a shield means as at 65.

The shield means 65 is a substantially annular member, semicircular or curved in cross section. It is connected at one end to the inner surface of the cover or lid means 51 as at 66 which is the point adjacent to the point where the wall 63 normal to the cover or lid means joins the inner surface of the cover or lid means 51.

The shield means 65 may be connected at the point 66 as by welding indicated at 67 or by any suitable means so as to position the curved wall 65 so that it shields the transport openings 64 of the fluid and transport means 60.

It will be noted that the shield means 65 forms within the rim 68 remote from the point of connection 66 an enlarged opening to permit the fluid condensed on the inner surface 69 within the space enclosed by the shield means to pass readily back to the liquid 56 in the chamber 55 of the cooking or heating vessel 52.

OPERATION

The operation of the cover or lid means 51 and the cooking vessel 52 is substantially identical to that above described for the form of the invention shown in FIGS. 2 and 5 of the drawings.

In this form of the invention, however, the form of shielding as at 65 presents spattering liquid from passing through the transport opening 64 and the curved surfaces permit return of condensed vapors readily to the liquid 56 in the cooking chamber 55.

COVER OR LID MEANS WITH A TRANSPARENT SECTION

In the above described forms of the invention the cover or lid is illustrated as made of a material which is not transparent, for example, stainless steel or aluminum.

For the type of cooking to which the present cover or lid is particularly applicable it would be highly desirable to observe the progress of the liquid or other mixture being cooked in the chamber formed by the vessel and its cover without lifting the cover.

One method of meeting this problem would be to make the cover or lid of a transparent material such as the glass material sold under the trademark "PYREX" which can withstand elevated temperatures to which the cover or lid will be subjected. However, the forming and shaping of such glass material would render a cover or lid such as is above described for FIGS. 2 and 5 of the drawings very costly.

Another method would be to insert a window into the domed portion of the cover or lid. However, for cooking purposes this would not be sufficient and presents other problems relative to sealing of the window and removing of the window for cleaning purposes.

FIGS. 7 to 9 and FIGS. 10 to 12 illustrate alternate forms of a cover or lid in accordance with the present invention in which substantial sections of the cover or lid are transparent which forms of the invention provide a less costly cover or lid and provide the same advantages that an all glass cover would provide where observation of the cooking mixture without lifting the cover or lid is desirable.

Thus referring to FIGS. 7 to 9, the cover or lid means 71 coacts with a heating, cooking or frying vessel generally designated 72 which is similar to the vessel above described for the FIG. 1 form of the invention, so that in assembled position as shown in FIG. 8 the cover or lid means 71 will form with the vessel 72 a heating, cooking or frying space or chamber generally designated 73.

The cover or lid means 71 is illustrated as a substantially circular platelike member in the conventional form of cover or lids for cooking vessels however it could have other shapes without departing from the scope of the present invention. It includes an annular rim section 74 and a domed transparent central section 75. A knob 76 serves as a handle for moving the cover or lid means 71.

The annular rim section 74 is preferably made of some suitable type of metal adapted for cookware such as stainless steel, aluminum or copper alloy and the transparent central section is made of plastic materials such as polycarbonate which will withstand high temperatures or various types of glass also adapted to withstand high temperature and to be molded into the desired shape such as the above-mentioned glass sold under the trademark "PYREX."

About the inner periphery of the annular rim section 74 is a substantially vertical wall 77 which is normal or substantially perpendicular to the horizontal plane of the cover or lid 71 as is shown in FIGS. 8 and 9 of the drawing.

FIGS. 8 and 9 further show that the annular rim section 74 has an annular portion 74a on a slightly different plane than the inner annular portion 74b so that a shoulder or ridge 78 is formed inwardly of the periphery of the annular rim section 74. This ridge or shoulder 78 will engage the edge 79 of the vessel 72 and act to center the cover or lid into operating position and to form a low leakage seal with the edge 79.

The vertical wall 77 is provided with a plurality of venting and transport openings as at 80 and at spaced intervals therebetween a plurality of catch members 81 are affixed or as shown clearly in FIG. 9 struck inwardly on the annular vertical wall 77. The catch members 81 engage and hold the rim 82 of the transparent central section 75. The catch members 81 consist of an inwardly extending flange 83 and spaced therefrom a rounded stop member 84. The spacing between the flange 82 and the stop member 83 will be a function of the thickness of the peripheral edge portion of rim 82 of the transparent central section 75.

Further the catch member 81 will be positioned to bring the edge or rim 82 into substantial abutment with the vertical annular wall 77 so that the rim 82 forms with the annular vertical wall 77 an annular reservoir or grove generally designated 85, equivalent to and substantially identical in construction to the annular reservoir or groove 11 of the fluid transport and venting means for the form of the invention shown in FIGS. 1 to 3 of the drawings.

The annular reservoir or grove 85 and the venting and transport openings 80 serve the same function and purpose of the equivalent means as described for the form of the invention shown in FIGS. 1 to 6 and accordingly liquids may be passed therethrough to the chamber 73 formed by the cover or lid means 71 and the vessel 72 and vapors and noncondensible groves may be vented from the chamber.

By reference to FIGS. 8 of the drawing when the cover or lid means 71 is in assembled position the annular reservoir or groove 83 extends into the chamber 73 formed by the vessel 72 and the cover 71 so that the vertical wall 77 which is substantial normal or perpendicular to the horizontal plane of the cover or lid means will be a predetermined spaced distance from the inner face of the sidewall of the heating, cooking or frying vessel 72. The importance of this spaced distance has been previously described with respect to the form of the invention shown in FIGS. 1 to 3 of the drawings and this applies equally to the present form of the invention shown in FIGS. 7 to 9 of the drawings.

In assembled position this form of the invention operates identical to the FIG. 1 form of the invention as above described. Further however, because the center section 75 is transparent it is possible to observe the condition of the liquid or other mixture cooking in the chamber 75.

This form of the invention however additionally permits the transparent central section 75 to be removed, cleaned and replaced. This can be accomplished because the annular wall 77 is made relatively thin and thus has a limited degree of resilience. Accordingly, the wall 77 and the catch members 81 can be deformed to slip the central section 75 into and out of position.

FIGS. 10, 11 and 12 show another form of cover or lid in accordance with the present invention having a cover or lid with a transparent section therein which permits viewing the liquid or other mixture being cooked in the associated vessel.

Thus, FIGS. 10, 11 and 12 show a cover or lid means 91 coacting with a heating, cooking or frying vessel generally designated 92 which is similar to the vessel above described for the FIG. 1 form of the invention, so that in assembled position the cover or lid means 91 forms with the vessel 92 a heating, cooking or frying space or chamber designated 93.

As in previous forms of the invention the cover or lid means 91 is a substantially platelike member and includes an annular rim section 94 and a domed transparent central section 95. A knob 96 is provided to permit handling of the cover or lid means 91.

The annular rim section 93 as in the form of the invention shown in FIGS. 7, 8 and 9 is made of a suitable type of metal used for cookware such as stainless steel, aluminum or copper alloy and the transparent central section 95 will be made of plastic or glass materials adapted to withstand high temperatures. The materials used should be adapted for molding, shaping or cutting the rim section 94 and the central section 95 to the indicated configurations to accomplish the desired joinder of these interrelated parts.

FIGS. 11 and 12 show that annular rim section 94 includes an outer portion 97 which is on a slightly different plane than an inner portion 98 to form a shoulder or ridge 99 inwardly of the periphery of the annular rim section 74.

This ridge or shoulder will engage the edge 100 of the vessel 92 and will act to center the cover or lid into operating position and will form a low leakage type seal with the edge 100.

In FIG. 12 an additional section 101 is shown in phantomized form as connected outboard of the outer portion 97 of the annular rim section 93 and on a still further and different plane so as to form a second ridge or shoulder 102. This is to illustrate that the cover or lid means 91 in this and in the other forms of the present invention shown and described herein may be useful with cooking, heating or frying vessels of different diameters.

The inner periphery of the annular rim section 74 as shown in FIGS. 11 and 12 is bent or formed to provide a U-shaped connector 103 which has an annular groove 104 for holding the peripheral edge 105 of the transparent central section 92 which in this form of the invention is struck, molded, shaped or formed to provide the fluid transport and venting means now to be described.

Thus, FIGS. 11 and 12 of the drawings, show in the transparent central section an annular reservoir or groove 107 having at least one curved wall 108 and at least one wall 109 substantially and generally normal or perpendicular to the horizontal plane of the cover or lid means 91.

The wall 109 has a plurality of spaced openings or ports 110 formed therethrough which openings communicate at one end with the annular reservoir or groove 107 and at the other end with the chamber 95 formed when the cover or lid means 91 is in operating position on the vessel 92.

The curved wall 108 is continuous with the adjacent domed section 111 at its inner end and at the outer end connected to the lower end of the wall 109. The upper end of wall 109 in turn is connected to a peripheral edge 105 of the central section 92 which engages and fits into the annular grove 104 of the U-shaped connector 103 provided on the inner periphery of the annular rim section 74.

The groove 104 in the U-shaped connector 103 and the peripheral edge 105 can be constructed and bonded together so as to form a single integral unit.

Alternatively, a two piece separable unit can be made by varying the length of the peripheral edge 105 and by providing the annular rim section 94 with sufficient resiliency to permit deformation of the rim section 94 sufficient to disconnect the U-shaped connector 103 from the peripheral edge 105 in the same manner that a tire is removed from engagement with the hub of a wheel.

Whether, in integral or separable form the ultimate shape of this form of the invention is substantially similar to that of the form of the invention shown in FIGS. 1 to 3 of the drawings.

Accordingly, in assembled position the cover or lid means 91 operates identical to the form of the invention shown in FIGS. 1 to 3 of the drawings, above described and the comments applicable to the FIG. 1 to 3 form of the invention regarding the positioning of the annular reservoir as extending into the chamber and its relative position to the adjacent sidewall of the vessel 92 are equally applicable to both this form of the invention as shown in FIGS. 10, 11 and 12 and the form of the invention as shown in FIGS. 7, 8 and 9 of the drawings.

COVER OR LID WITH TRANSPARENT SECTION HAVING WIPING MEANS

Where certain mixtures are being cooked in the vessel with an associated cover or lid means, having a transparent section in accordance with the present invention, it is entirely possible for the inner surface or inner face of the transparent section to become clouded or smeared with the mixture so that visibility through the transparent section may become difficult.

In the form of the invention shown in FIGS. 13 to 17 a cover or lid means having a transparent section is illustrated with a wiper means to overcome this problem.

Thus FIGS. 13 to 17 show a cover or lid means 121 coacting with a heating, cooking or frying vessel 122. Cover or lid means 121 is substantially identical with the form of the invention shown in FIGS. 10 to 12 of the drawings and thus includes the annular rim section 123 and the transparent central sections 124. A knob 125 is rotatably connected to the central section 124 to act as a handle for the cover or lid means 121 and for actuating a wiper means 126 to be described below.

The shape of the transparent central section 124 differs slightly in that a portion of the domed portion is planar to facilitate coaction with linear type wiper means 126 which is connected to the knob 125 and rotates therewith as will be described below. It will be understood that a domed transparent central section could also be used with a curved type wiper means as will be understood by those skilled in the art.

Thus, as shown in FIG. 14, the transparent central section 124 includes a flat center portion 127 and an annular sloped conelike portion 128 which is connected at its upper end to the periphery of the flat center portion 127 and at its lower end to the curved wall 129 of the annular reservoir means formed on the transparent central section 124 as was above described for the form of the invention shown in FIGS. 10 to 12.

Figure 13:
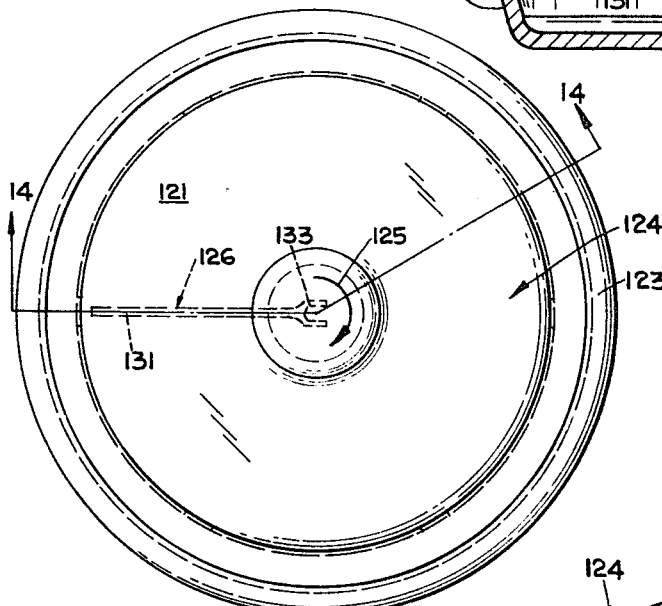
FIG. 13 is a top view of still another form of cover or lid means in accordance with the present invention having a transparent section and a rim section and showing wiping means thereon for cleaning the inner face of the transparent section.
Figure 15A:
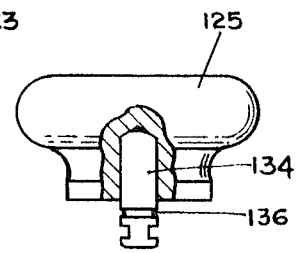
FIGS. 15a to 15d is an exploded view of the various elements of the wiping means, their relation to each other and to the associated transparent portion of the cover or lid means shown in FIG. 13.
Figure 15:
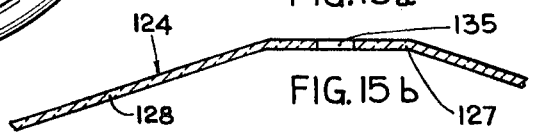
Figure 15:
Figure 15:
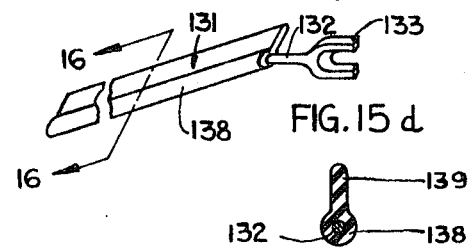

In order to maintain the underside or undersurface 130 of the sloped or conelike portion 128 of the transparent central section 124 clear the wiping means 126 is provided with a wiper blade 131 to engage the undersurface 130 as is illustrated at FIGS. 13 and 14. The wiper blade 131 is made of any suitable type rubber or other resilient material able to withstand the high temperature to which the underside or undersurface 130 of the sloped or conelike portion 128 will be subjected.

The wiper blade 131 is connected to a wiper arm 132 which is an elongated member disposed to extend beyond the inner end of the wiper blade where it is provided with a forked clip means 133 for detachably connecting the wiper blade to a wiper axle 134 in turn fixedly connected to the knob 125, which has spaced slots 134a and 134b. Axle 134 will in assembled position extend through a suitable opening as at 135 in the flat center portion 127 to receive the forked clip means. The axle is also provided with a groove as at 136 which is engaged by a fastener 137 that holds the axle and knob in assembled position but permits the knob, the axle and the wiper arm with the wiper blade attached thereto to be rotated through 360°.

Figure 16:
FIG. 16 is an enlarged cross section taken on line 16-16 through the wiper blade of the wiping means shown in FIG. 15d.

The wiper blade 131 in cross section includes the thickened portion 138 through which the wiper arm 132 extends and the wiping portion 139 which is relatively thin as is shown in FIG. 16 of the drawings.

Figure 17:
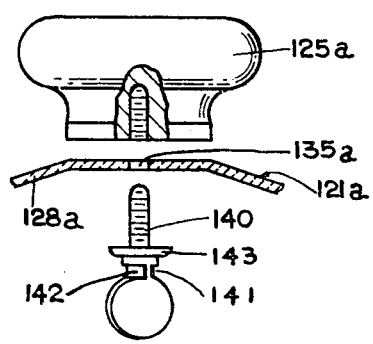
FIG. 17 is an exploded view of another form of operating handle and connecting means for the wiping means shown in FIG. 13.

FIG. 17 shown an alternate connector for the knob and wiping means of the form of the invention shown in FIGS. 13 to 16, in which the knob 125a coacts with a threaded attaching member 140 having spaced grooves as at 141 and 142 which receive therein the forked clip means 133 of the wiper blade arm 132, above described for the wiping means shown in FIGS. 13 to 16 of the drawings. The threaded attaching means 140 coacts with a thrust bearing in the form of a washer 143 which permits the knob 125a to be connected to the flat central portion 127a through an opening 135a and still rotate. The knob 124a, the threaded attaching member 140 and the parts of the wiping means connected thereto in assembled position can be rotated through 360° so that the wiping blade will clean the undersurface of the associated conelike central section 128a of the cover or lid means 121a.

While there has been hereinbefore described approved embodiments of the invention, it will be understood that many and various changes and modifications in form, arrangement of parts and details of construction thereof may be made without departing from the spirit and scope of the present invention, and that all such changes and modifications as fall within the scope of the appended claims are contemplated as a part of this invention.

What I claim is:

1. A utensil lid for a heating, cooking or frying vessel comprising:
   a. a platelike member including a centrally disposed domed portion, means forming an annular reservoir connected to the inner side adjacent to the peripheral part of the domed portion and an annular portion connected to the outer side of the annular reservoir means remote from the domed portion;
   b. said annular reservoir means extending below said annular portion and the peripheral portion of the domed portion of the platelike member and having at least one curved wall and at least one wall normal to a horizontal plane through the platelike member;
   c. said curved wall shaped with a radius of curvature continuous with the domed portion of the platelike member and connected to the lower end of said normal wall whereby the domed portion and the curved wall provide a condensing surface for vapors and means to return condensed vapor to the associated vessel;
   d. said normal wall at the upper end connected to the annular portion a spaced distance inward from the peripheral edge thereof;
   e. and said annular reservoir means having fluid transport and venting means to permit liquid to be passed therethrough and to pass vapors and noncondensible gases from the associated vessel.

2. In a utensil lid as claimed in claim 1 wherein the spaced distance the normal wall is connected inward of the periphery of the annular portion of the platelike member is in an optimum range for the given diameter of the utensil lid.

3. In a utensil lid as claimed in claim 2 wherein said normal wall is spaced in assembled position for operative relation with the sidewall of the associated vessel to prevent escape of spattering liquids from the vessel.

4. In a utensil lid as claimed in claim 1 including a shield means connected to said utensil lid adjacent the fluid transport and venting means to present spattered liquid from escaping from said vessel.

5. In a utensil lid as claimed in claim 1 wherein an optically transparent section is provided.

6. In a utensil lid as claimed in claim 1 wherein the centrally disposed domed portion is optically transparent.

7. In a utensil lid as claimed in claim 6, including:
 a. wiping means detachably connected to said utensil lid,
 b. a wiping element on said wiping means in engagement with the undersurface of the optically transparent centrally disposed domed portion,
 c. and means for operating said wiping means when said utensil lid is in operating position on said vessel.

8. In a utensil lid as claimed in claim 6, wherein said annular portion is detachably connected to said centrally domed portion.

9. In a utensil lid as claimed in claim 6, wherein said annular portion has said normal wall formed therein and said centrally domed portion has said curved wall formed thereon, and means on said normal wall to detachably connect said domed portion to said annular portion.

10. In a utensil lid as claimed in claim 9 wherein the detachable connecting means includes a plurality of spaced catch members, and said catch members are disposed to hold the domed portion in predetermined position on said normal wall for suitable coaction with said fluid transport and venting means.

11. In a utensil lid as claimed in claim 6 wherein said means forming the annular reservoir is connected to said domed portion and:
 a. means forming a peripheral edge in said domed portion about said annular reservoir,
 b. connecting means on said annular portion to engage and hold said peripheral edge of said domed portion.

12. In a utensil lid for a heating, cooking and frying vessel comprising:
 a. a platelike member including an annular rim section, and a transparent central section.
 b. means forming an annular reservoir connected to the inner side of the transparent central section,
 c. means connecting the annular rim section to the annular reservoir means on the side remote from the inner side of the annular reservoir,
 d. said annular reservoir means extending below said annular portion and the adjacent portion of the transparent central section and having fluid transport and venting means to permit liquid to be passed therethrough and to pass vapors and noncondensible gases when in operating position on said vessel,
 e. and said connecting means is disposed on the annular rim section adjacent said annular reservoir means.

13. In a utensil lid as claimed in claim 12, wherein:
 a. the annular reservoir means includes a wall normal to the plane of the utensil lid,
 b. said normal wall connected about the inner periphery of the annular rim section,
 c. ports in said normal wall constituting the fluid transport and venting means for said annular reservoir means,
 d. and the connecting means comprises a plurality of catch members disposed to detachably hold the edge of the transparent central section in spaced operative relation to said ports.

14. In a utensil lid as claimed in claim 12 wherein:
 a. the annular reservoir is formed continuous with and about the transparent central section,
 b. a peripheral edge on said transparent central section connected to said normal wall at the upper end thereof,
 c. and said connecting means comprising a U-shaped member forming a groove to receive and hold the peripheral edge of the domed transparent central section.